United States Patent [19]
Rosenthal et al.

[11] Patent Number: 5,802,902
[45] Date of Patent: Sep. 8, 1998

[54] PRODUCTION PLANT FOR CONTINUOUSLY OR DISCONTINUOUSLY ROLLING HOT STRIP

[75] Inventors: Dieter Rosenthal, Niederfischbach; Wilfried Bald, Hilchenbach, both of Germany

[73] Assignee: SMS Schloemann-Siemag Aktiengesellschaft, Düsseldorf, Germany

[21] Appl. No.: 743,431

[22] Filed: Nov. 1, 1996

[30] Foreign Application Priority Data

Nov. 3, 1995 [DE] Germany .................. 195 40 978.7

[51] Int. Cl.⁶ .................................................. B21B 1/04
[52] U.S. Cl. ........................... 72/201; 72/203; 72/40
[58] Field of Search ........................ 72/200, 201, 203, 72/40

[56] References Cited

U.S. PATENT DOCUMENTS

| | | | |
|---|---|---|---|
| 2,343,392 | 3/1944 | Whitten | 72/200 |
| 3,514,984 | 6/1970 | Cook | 72/201 |
| 3,918,282 | 11/1975 | Eibe | 72/200 |
| 4,274,273 | 6/1981 | Fapiano | 72/201 |
| 5,235,840 | 8/1993 | Blazevic | 72/201 |
| 5,329,688 | 7/1994 | Arvedi | 72/201 |

FOREIGN PATENT DOCUMENTS

| | | | |
|---|---|---|---|
| 4402402 | 8/1995 | Germany . | |
| 84207 | 6/1980 | Japan | 72/200 |
| 656682 | 4/1979 | U.S.S.R. | 72/200 |
| 755354 | 8/1980 | U.S.S.R. | 72/200 |
| 9208557 | 5/1992 | WIPO . | |

*Primary Examiner*—Daniel C. Crane
*Attorney, Agent, or Firm*—Friedrich Kueffner

[57] ABSTRACT

A production plant for rolling hot strip from slabs produced by continuous casting, wherein a shearing machine is arranged following a continuous casting plant of the casting machine and in front of an equalizing furnace, and an additional shearing machine and a descaling unit are arranged following the equalizing furnace and in front of a rolling mill, and wherein a heating or cooling unit and a strip reeling unit of coiling machine are arranged following the rolling mill. A first roll stand group forming a continuously operating rolling train is composed of several four-high stands, for example, five four-high stands; individual heating devices are provided also between the successive four-high stands of this group of roll stands; in addition, the reeling unit or the reeling machine is configured as a double reeling machine.

15 Claims, 1 Drawing Sheet

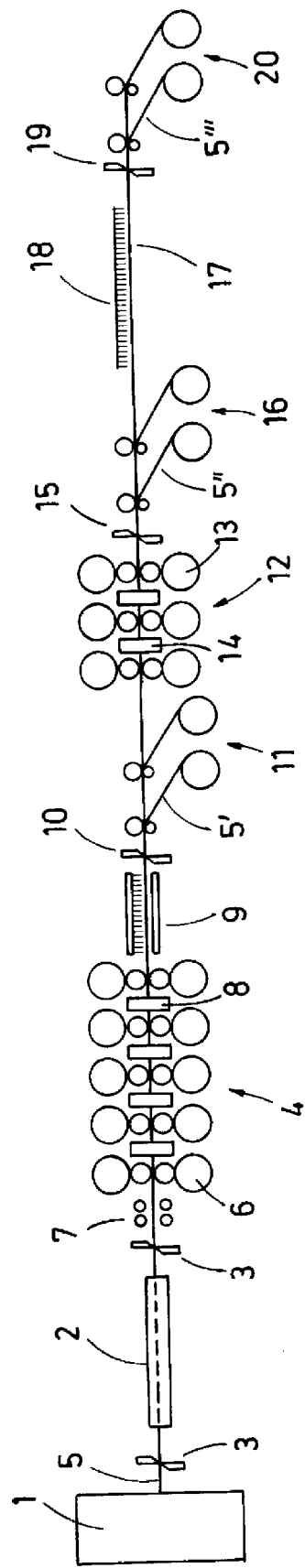

PRODUCTION PLANT FOR CONTINUOUSLY OR DISCONTINUOUSLY ROLLING HOT STRIP

BACKGROUND OF THE INVENTION

1. Field of the Invention

The present invention relates to a production plant for rolling hot strip from slabs produced by continuous casting, wherein a shearing machine is arranged following a continuous casting plant of the casting machine and in front of an equalizing furnace, and an additional shearing machine and a descaling unit are arranged following the equalizing furnace and in front of a rolling mill, and wherein a heating or cooling unit and a strip reeling unit of coiling machine are arranged following the rolling mill.

2. Description of the Related Art

Rolling plants for producing hot-rolled strips are generally constructed and operated today in such a way that the deformation in the individual stands takes place austenitically; this means that it is ensured that the rolling temperatures in the individual roll stands are above the GOS line ($A_3$ line) of the iron/carbon diagram. Cooling to reeling temperature with a structure transformation in the cooling stretch or in the wound-up coil takes place only after the last pass which, for obtaining a fine-grained final structure, should be as close as possible to the GOS line.

In the case of steels having a carbon content of less than 0.2%, for rolling in accordance with the above-described method, the final rolling temperature, i.e., the temperature in the last roll stand of the rolling train, is 840° to 920° C., depending on the carbon content. The final rolling temperature is maintained by selecting the final rolling speed.

This method can be used without problems for strip thicknesses above a minimum strip thickness, which, depending on the type of rolling train, is in the order of magnitude of 1.3 mm. However, if the strip thickness drops below this minimum thickness, the required rolling speed reaches values above 12 m/sec; this speed is so high that, in the case of discontinuous operation, the strip can no longer be handled at the free runout on the roller table following the rolling train.

In spite of the problems discussed above, the tendency is to develop smaller final thicknesses; this means that the tendency was to reduce the final rolling temperature in order to facilitate slower rolling speeds. These rolling processes have become known under the name ferritic rolling because they take place at temperatures below the GOS line, i.e., in the range of the alpha, gamma mixed crystals or below the GPS line (border line of homogenous ferritic crystals) in the ferritic range.

In accordance with a preferred method, a break-down rolling is carried out in the austenitic range to an intermediate thickness of below 15 mm and finish rolling is carried out in the ferritic range to the smallest final thicknesses below 1.3 mm. Between these two process stages, the rolling stock must be cooled from the final rolling temperature in the austenitic range to the rolling temperature in the ferritic range. This means a cooling from the temperature range of 840° C. to 920° C. to the temperature range of 600° C. to 780° C.

The final rolling temperature following the second deforming stage is also in the range of 600° to 780° C. and, thus, in an order of magnitude in which a recrystallization of the structure occurs after reeling in the wound-up coil. A structure is produced which facilitates the use of the product without further cold deformation or heat treatment.

An essential requirement for a good result is that a minimum cooling time is maintained for cooling from the austenitic range into the ferritic range. This minimum cooling time must be maintained in order to make it possible that the transformation from austenite to ferrite can take place to a sufficient extent.

The realization of the above-described process is very difficult in a conventional rolling train for hot-rolled wide strip. The transformation from the austenitic range into the ferritic range should be carried out in the thickness range of below 15 mm, i.e., in a thickness range in which the rolling stock is approximately in the middle of a conventional finishing train. Since the travel time of the strip from one stand to the next stand in the middle of the finishing train takes only a few seconds, it is possible in principle to realize this cooling, however, it is not possible to realize the time required for the transformation. Accordingly, in a conventional rolling train for rolling hot-rolled wide strip, it is not possible to carry out ferritic rolling in accordance with the above-described method.

To make it possible that a selectable portion of the reduction of the strip can take place in the ferritic range with a desired limitation of the run-out speed, a prior not yet published application proposes a production plant in which at least the first roll stand of the rolling train is a reversing stand, at least one reeling furnace each is arranged in front of and following the reversing stand, and a controllable cooling unit is provided between the reversing stand and the reeling furnace in front of the reversing stand.

This production plant can be operated in the austenitic range as is the case in conventional plants. For this purpose, the rolling stock supplied from a roughing train or a thin slab casting machine, which usually has a thickness of about 50 mm, is heated in a furnace to about 1100° C. and is rolled in the reversing train or Steckel train composed of one or more stands by adjusting one or more stands of the train; subsequently, the rolling stock is wound in the Steckel furnace or reeling furnace following the Steckel train. After reversing the Steckel train, the strip is pulled from the Steckel furnace and is rolled down to a thickness of about 10 mm in one or more stands of the Steckel train and is subsequently wound up in the Steckel furnace on the entry side. At this point, the temperature of the strip is still above 850° C. The strip is now unwound from the Steckel furnace on the entry side and is rolled down to a thickness of about 1 mm in the Steckel stands and in the remainder of the rolling train, and the strip is coiled by the coiling machine.

It is also possible to arrange a cooling unit in front of the point where the rolled strip is wound up in the Steckel furnace on the entry side, wherein the cooling unit cools the strip having a thickness of about 10 mm to temperatures below 850° C. After the ferritic transformation, the strip can be rolled down in the Steckel train and in the remainder of the rolling train into a strip having a thickness of about 1 mm, wherein this strip can then be used without any further cold deformation or heat treatment.

The rolling of hot strip products on Steckel trains with reversing operation and corresponding Steckel furnaces or reeling furnaces poses no problem.

SUMMARY OF THE INVENTION

It is the primary object of the present invention to provide a production plant for continuously or discontinuously rolling hot strip having an austenitic and/or ferritic structure.

In accordance with the present invention, this object is met by using as a first roll stand group a continuously operating rolling train composed of several four-high stands, for example, five four-high stands; individual heating devices are provided also between the successive four-high stands of this group of roll stands; in addition, the reeling unit or the reeling machine is configured as a double reeling machine.

This configuration of the plant makes it possible to fully continuously produce hot strip with austenitic structure and a thickness of about 2.5 mm–12 mm.

In accordance with a further development of the invention, an additional or second continuously or discontinuously operating rolling train composed of several finishing stands, for example, three finishing stands, is arranged following the first group of roll stands or the cooling unit or heating unit thereof, wherein an individual heating unit or cooling unit each may be provided between successive finishing stands, and wherein another shearing machine and a second double reeling machine are arranged following this second group of roll stands.

The hot strip arriving from the first group of stands can be rolled fully continuously in this second group of stands to a thickness of between 0.5 mm and 2.0 mm with an austenitic and/or ferritic structure. This is because it is possible to adjust to the correct temperature the hot strip by means of the cooling and heating units between the two groups of stands and possibly also the treatment units between the stands of the second group of roll stands.

Another further development of the present invention provides that a roller table section with laminar cooling is arranged following the second group of roll stands, i.e., following the second double reeling machine. A shearing machine and a third double reeling machine are again arranged following the roller table section.

In accordance with the invention, this third plant component makes it possible that hot strip can be fully continuously rolled by means of the two groups of roll stands with an austenitic structure and a thickness of greater than 1 mm. This is possible because an additional heat supply is carried out between the two groups of roll stands and possibly additionally also between the stands of the first and second groups of roll stands.

During continuous operation, the shearing machines in front of and following the equalizing furnace are only used when a problem occurs in any of the groups of the roll stands of the rolling train. On the other hand, the other shearing machines provided in the rolling train interact in a continuous operation only with the double reeling machines arranged immediately following the respective shearing machine.

Another important further development of the invention provides that both groups of roll stands of the rolling train each contain a number of individual stands which is greater by at least one than the number of stands absolutely required for the maximum deformation work to be performed. This makes it possible in an advantageous manner to carry out in-line maintenance work on any roll stand of the groups of roll stands, for example, a change of work rolls, while the remaining roll stands continue to carry out the deformation work in a fully continuous operation. Advantageously, a casting machine which can be operated with a casting speed of between 3 m/min and 18 m/min is arranged in front of the two groups of roll stands.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described preferred embodiments of the invention.

BRIEF DESCRIPTION OF THE DRAWING

In the drawing:

The single FIGURE of the drawing is a schematic view of a production plant according to the present invention for continuously or discontinuously rolling hot strip with austenitic and/or ferritic structure.

DESCRIPTION OF THE PREFERRED EMBODIMENTS

The production plant shown in the drawing includes as a continuous casting plant a casting machine 1 which is designed for a casting speed of about 3 m/min to 18 m/min. This casting machine 1 is followed by an equalizing furnace 2 which may operate with material management. A shearing machine 3 each is arranged in front of and behind the equalizing furnace 2. These two shearing machines 3 are used during the continuous operation only when a problem occurs in the rolling train following the equalizing furnace 2.

In the rolling train already mentioned above, a descaling unit 7 is arranged between the equalizing furnace 2 and a first roll stand group 4 for roughing-down rolling of the slabs 5.

The first roll stand group 4 includes a plurality, for example, five, four-high stands 6 which are constructed for a continuous rolling operation.

A heating unit 8 may be arranged between two successive four-high stands 6 of the roll stand group 4. In the illustrated embodiment, four heating units 8 are arranged between the five four-high stands 6 in order to maintain the strip subjected to rolling at the correct rolling temperature.

However, it should also be mentioned at this point that, for a manner of operation to be described later, a cooling unit each may be provided instead of or in addition to the afore-mentioned individual heating units 8.

A heating unit or a cooling unit 9 is arranged following the first roll stand group 4 and a shearing machine 10 follows the roll stand group 4.

Finally, a double reeling unit 11 is provided following the shearing machine 10. The double reeling unit 11 forms the end of a first plant component of the production plant. This first plant component of the production plant is capable of fully continuously rolling hot strip 5' with austenitic structure and a thickness of more than about 2.5 mm.

The first plant component described above is followed by a second plant component. This second plant component includes a second roll stand group 12 with a plurality, for example, three, four-high finishing stands 13, wherein individual heating units or cooling units 14 are provided between two successive finishing stands 13; in the illustrated embodiment, two heating units or cooling units 14 are provided.

Following the second roll stand group 12 with four-high finishing stands 13 and heating and cooling units 14 is arranged a shearing machine 15 for cutting the strip during continuous operation and the end of the second plant component is again formed by a double reeling unit 16.

The second plant component is capable of fully continuously rolling hot strip 5" with an austenitic and/or ferritic structure and a thickness of between 0.5 mm and 2.0 mm. In order to achieve this, it is necessary that the hot strip 5' which arrives from the first plant component and travels through the open shearing machine 10 and through the double reeling unit 11 is acted upon by the cooling and heating unit 9 between the first roll stand group 4 and the second roll stand group 12 and possibly also by the cooling and heating units 14 between the four-high finishing stands 13 of the second roll stand group 12, so that the strip is rolled in the correct structure range.

The hot strip 5" having an austenitic or ferritic structure is received by the double reeling unit 16 and is divided by the shearing machine 15.

The second plant component of the production plant is followed by a third plant component. This third plant component includes a roller table section 17 and a laminar cooling unit 18 which follow the second roll stand group 12 behind the double reeling unit 16.

The laminar cooling unit 18 is followed by a shearing machine 19 and the shearing machine 19, in turn, is followed by a double reeling unit 20.

The third plant component is capable of fully continuously producing hot strip 5'" with an austenitic structure and a thickness of greater than 2 mm. For this purpose, the strip is rolled continuously in the first roll stand group 4 and continuously in the second roll stand group 12.

When all three plant components of the production plant are in operation, the thin slabs 5 delivered from the thin slab casting machine 1 travel continuously through the entire plant and the finished hot strip 5'" is received by the double reeling unit 20; in that case, only the shearing machine 19 is in operation, while all other shearing machines 3, 10 and 15 are not in operation and are in the open position.

Finally, in order to be complete, it is pointed out that it is advantageous to select the number of individual stands 6 and 13, respectively, in the first stand group 4 as well as in the second roll stand group 12, in such a way that it exceeds by one the number of stands required for carrying out the deformation work in the respective roll stand group 4 or 12. This makes it especially possible to perform maintainance in-line on any one of the four-high stands 6 or four-high finishing stands 13, for example, for exchanging the work rolls, while the remaining four-high stands 6 or four-high finishing stands 13 carry out the deformation work in a fully continuous operation.

While specific embodiments of the invention have been shown and described in detail to illustrate the inventive principles, it will be understood that the invention may be embodied otherwise without departing from such principles.

We claim:

1. In a production plant for rolling hot strip from slabs produced by continuous casting, the production plant including a shearing machine in a strip travel direction following a continuous casting plant or a casting machine and in front of an equalizing furnace, an additional shearing machine and a descaling unit following the equalizing furnace and in front of a continuously operating rolling mill, and a heating or cooling unit and a strip reeling unit of a coiling machine following the rolling mill, the improvement comprising the rolling mill comprising a plurality of four-high stands as a first roll stand group, additional individual heating devices between the four-high stands of the first roll stand group, wherein the strip reeling unit is comprised of a double reeling machine.

2. The production plant according to claim 1, wherein the first roll stand group comprises five four-high finishing stands.

3. The production plant according to claim 1, further comprising a second roll stand group in the form of a continuously or discontinuously operating rolling train and comprising a plurality of four-high finishing stands, the second roll stand group following one of the first roll stand group and the heating or cooling unit thereof, further individual heating or cooling units in the second roll stand group, further comprising an additional shearing machine and a second double reeling unit following the second roll stand group.

4. The production plant according to claim 3, wherein the second roll stand group comprises three four-high finishing stands.

5. The production plant according to claim 3, wherein the further individual heating or cooling units are arranged between successive four-high finishing stands of the second roll stand group.

6. The production plant according to claim 3, further comprising a roller table section with laminar cooling arranged following the second roll stand group and the second double reeling unit, and a further shearing machine and a third double reeling unit being arranged following the roller table section.

7. The production plant according to claim 3, wherein each of the first and second roll stand groups of the continuous rolling train has a number of individual stands which number is greater by one than a number of stands required for a maximum deformation work to be performed.

8. The production plant according to claim 1, wherein the casting machine has a casting speed of between about 3 m/min and 18 m/min.

9. In a production plant for rolling hot strip from slabs produced by continuous casting, the production plant including a shearing machine in a strip travel direction following a continuous casting plant or a casting machine and in front of an equalizing furnace, an additional shearing machine and a descaling unit following the equalizing furnace and in front of a continuously operating rolling mill, and a heating or cooling unit and a strip reeling unit of a coiling machine following the rolling mill, the rolling mill comprising a plurality of four-high stands as a first roll stand group, additional individual heating devices between the four-high stands of the first roll stand group, wherein the strip reeling unit is comprised of a double reeling machine, further comprising a second roll stand group in the form of a continuously or discontinuously operating rolling train and comprising a plurality of four-high finishing stands, the second roll stand group following one of the first roll stand group and the heating or cooling unit thereof, further individual heating or cooling units in the second roll stand group, further comprising an additional shearing machine and a second double reeling unit following the second roll stand group.

10. The production plant according to claim 9, wherein the second roll stand group comprises three four-high finishing stands.

11. The production plant according to claim 9, wherein the further individual heating or cooling units are arranged between successive four-high finishing stands of the second roll stand group.

12. The production plant according to claim 9, further comprising a roller table section with laminar cooling following the second roll stand group and the second double reeling unit, and a further shearing machine and a third double reeling unit following the roller table section.

13. The production plant according to claim 9, wherein each of the first and second roll stand groups of the continuous rolling train has a number of individual stands which number is greater by one than a number of stands required for a maximum deformation work to be performed.

14. The production plant according to claim 9, wherein the casting machine has a casting speed of between about 3 m/min and 18 m/min.

15. The production plant according to claim 9, wherein the first roll stand group comprises five four-high finishing stands.

* * * * *